United States Patent
Kawaoka

(10) Patent No.: US 7,289,977 B2
(45) Date of Patent: Oct. 30, 2007

(54) IMAGE FILE APPARATUS AND METHOD

(75) Inventor: Yoshiki Kawaoka, Asaka (JP)

(73) Assignee: Fujifilm Corporation, Tokyo (JP)

(*) Notice: Subject to any disclaimer, the term of this patent is extended or adjusted under 35 U.S.C. 154(b) by 0 days.

(21) Appl. No.: 09/490,061

(22) Filed: Jan. 24, 2000

(65) Prior Publication Data

US 2003/0055840 A1    Mar. 20, 2003

(30) Foreign Application Priority Data

Jan. 27, 1999    (JP) ................. 11-018021

(51) Int. Cl.
*G06F 7/00* (2006.01)

(52) U.S. Cl. .............. 707/2; 707/1; 707/200; 386/117

(58) Field of Classification Search ............ 707/1, 707/200, 2; 345/825; 386/117
See application file for complete search history.

(56) References Cited

U.S. PATENT DOCUMENTS 5,806,072 A * 9/1998 Kuba et al. ............ 707/200
6,373,507 B1 * 4/2002 Camara et al. .......... 345/825
6,438,320 B1 * 8/2002 Hatanaka ............... 386/117

FOREIGN PATENT DOCUMENTS

EP    0 838 767 A2 *    4/1998

OTHER PUBLICATIONS

Que Corporation, "Big Basics Book of Windows 95", Que, Second Edition, p. 14.*

* cited by examiner

*Primary Examiner*—Hung Q Pham
(74) *Attorney, Agent, or Firm*—Birch, Stewart, Kolasch & Birch, LLP

(57) ABSTRACT

When an electronic album is created, different images having identical file names are prevented from being recorded on a large-capacity floppy disk. Image files have been recorded on a memory card and on a large-capacity floppy disk in the order of file numbers. When an image file that has been recorded on the first memory card is recorded on the large-capacity floppy disk, the final file number on the large-capacity floppy disk is read out. The file number of the image file that has been read out of the first memory card is changed to a file number that succeeds the file number recorded on the large-capacity floppy disk last. The image file whose file number has been changed is recorded on the large-capacity floppy disk and an electronic album is generated for each type of image.

20 Claims, 6 Drawing Sheets

IMAGE FILE APPARATUS AND METHOD

BACKGROUND OF THE INVENTION

1. Field of the Invention

This invention relates to an image file apparatus and method for reading out image files that have been recorded on a first recording medium and recording the read image files on a second recording medium.

2. Description of the Related Art

There are instances where when an image file that has been stored on a first recording medium is read out and recorded on a second recording medium, an image file having the same file name as that of the image file read out of the first recording medium has already been recorded on the second recording medium. It is necessary for image files and their file names to have one-to-one correspondence and different image files are not allowed to have the same file name. When an image file that has been read out of the first recording medium is recorded on the second recording medium, therefore, often the image file that has been read out of the first recording medium is written over the image file that has been recorded on the second recording medium.

If an image file that has been read out of the first recording medium is written over an image file that has been recorded on the second recording medium, the image file already recorded on the second recording medium will be erased.

Likewise, when images are grouped by type to create a so-called "electronic album", two or more different images are not allowed to have the same file name.

Further, there are occasions where when an image file is read out of a first recording medium and the read image file is recorded on a second recording medium, the file name of the image file being recorded on the second recording medium is displayed. However, merely displaying the file name makes it difficult for the user to determine what kind of image the image file represents.

DISCLOSURE OF THE INVENTION

Accordingly, an object of the present invention is to so arrange it that when image files are read out of a first recording medium and stored on a second recording medium to create a so-called "electronic album", the image files stored on the second recording medium will not have duplicate file names.

Another object of the present invention is to so arrange it that when an image file is read out of a first recording medium and stored on a second recording medium, the user is notified reliably of the kind of image file that is being recorded on the second recording medium.

According to a first aspect of the present invention, the foregoing objects are attained by providing an image file apparatus for reading out an image file that has been recorded on a first recording medium and recording this image file on a second recording medium, comprising: an image file readout unit for reading out an image file that has been recorded on the first recording medium; a file-name duplication discrimination unit (file-name duplication discrimination means) for determining whether a file name of the image file that has been read out by the image file readout unit and a file name of an image file that has been recorded on the second recording medium are duplicates; an image-file recording controller (image-file recording control means), which is responsive to a determination by the file-name duplication discrimination unit that the file names are duplicates, for changing the file name of the image file that has been read out of the first recording medium and recording this read image file on the second recording medium in such a manner that file names of image files that have been recorded on the second recording medium will not be duplicated; and a grouping unit (grouping means) for grouping image files, which have been recorded on the second recording medium by the image-file recording control unit, according to the types of images represented by the image files.

The first aspect of the present invention provides also a method suited the image file apparatus described above. Specifically, an image file method in an image file apparatus for reading out an image file that has been recorded on a first recording medium and recording this image file on a second recording medium comprises the steps of: reading out an image file that has been recorded on the first recording medium; determining whether a file name of the image file that has been read out of the first recording medium and a file name of an image file that has been recorded on the second recording medium are duplicates; in response to a determination that the file names are duplicates, changing the file name of the image file that has been read out of the first recording medium and recording this read image file on the second recording medium in such a manner that file names of image files that have been recorded on the second recording medium will not be duplicated; and grouping image files, which have been recorded on the second recording medium, according to the types of images represented by the image files.

In accordance with the first aspect of the present invention, an image file is read out of the first recording medium. It is determined whether the file name of the image file that has been read out duplicates the file name of any image file that has already been recorded on the second recording medium. If file names are duplicates, the file name of the image file that has been read out of the first recording medium is changed so that it will not duplicate the file name of any image file that has been recorded on the second recording medium. The image file having the changed file name is recorded on the second recording medium.

Since the file name of an image file read out of the first recording medium is changed before it is recorded on the second recording medium, image files having identical file names are prevented from being recorded on the second recording medium. Thus, since image files that have been recorded on the second recording medium will not be erased, it is also possible to prevent important files from being erased from the second recording medium inadvertently.

When image files that have been read out of the first recording medium are recorded on the second recording medium, they are grouped according to the types of images represented by the image files. This creates a so-called "electronic album".

Since different image files having the same file name can be prevented from being recorded on the second recording medium, it is possible to create an electronic album in which the images have been grouped appropriately.

The above-mentioned grouping may be performed by recording file names corresponding to respective ones of the groups on the second recording medium. File names belonging to respective ones of the groups can be displayed in a list on a group-by-group basis.

An image file apparatus according to a second aspect of the present invention comprises: an image file readout unit for reading out an image file that has been recorded on a first recording medium; a recording controller for recording the image file, which has been read out by the image file readout unit, on a second recording medium; and an output unit for outputting an image file being recorded on the second recording medium by the recording controller.

The second aspect of the present invention provides also a method suited the image file apparatus described above. Specifically, an image file method according to the second aspect of the invention comprises the steps of: reading out an image file that has been recorded on a first recording medium; recording the read image file on a second recording medium; and outputting an image file being recorded on the second recording medium.

In accordance with the second aspect of the present invention, an image file that has been recorded on the first recording medium is read out and recorded on the second recording medium, and the image file being recorded on the second recording medium is output.

By applying an image file to, e.g., a display unit, the image represented by this image file is displayed. While verifying the image represented by the image file being recorded on the second recording medium, the user is capable of recording the image file on the second recording medium. This makes it possible to tell which image file is being recorded on the second recording medium.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention will now be described with reference to the drawings.

Figure 1:
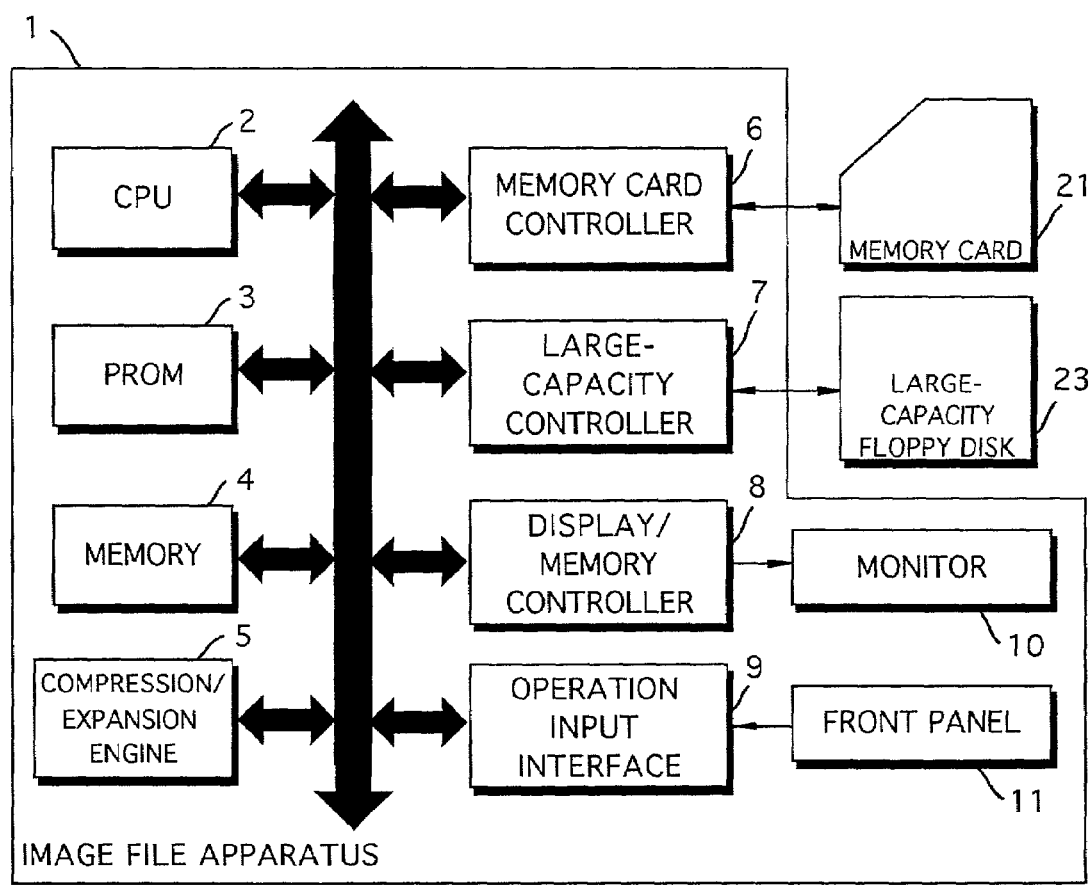
FIG. 1 is a block diagram illustrating the electrical construction of an image file apparatus.

FIG. 1 is a block diagram illustrating the electrical construction of an image file apparatus 1 according to an embodiment of the present invention.

The image file apparatus according to this embodiment reads out image files that have been stored on a memory card (a first recording medium) 21 and records the read image files on a large-capacity floppy disk (FD) (a second recording medium) 23, thereby creating a so-called "electronic album".

The overall operation of the image file apparatus 1 is controlled by a CPU 2.

The image file apparatus 1 includes a PROM (programmable read-only memory) 3 in which an operating program has been stored, a memory 4 for temporarily storing image data (image files) and other data, and a compression/expansion engine 5 for compressing image data and expanding image data that has been compressed. The image file apparatus 1 further includes a memory-card controller 6 for reading out image files that have been recorded on a memory card 21 and recording image files on the memory card 21, a large-capacity controller 7 for reading out image files that have been recorded on the large-capacity floppy disk 23 and recording image files on the large-capacity floppy disk 23, a display/memory controller 8 for controlling the memory 4 and controlling display of images on a monitor display unit 10, and an operation-input interface 9 for accepting command input from a front panel 11.

Figure 2:
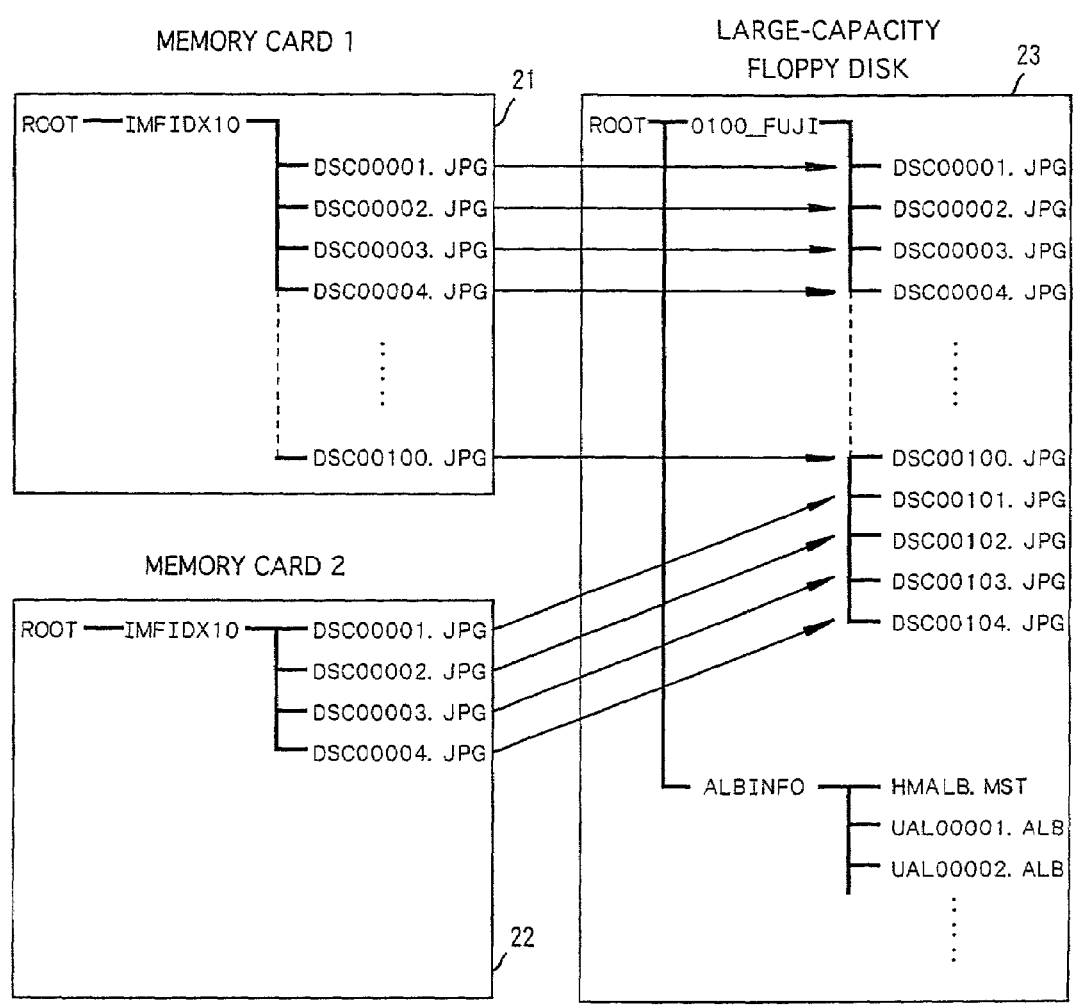
FIG. 2 shows the directory structures of memory cards and a large-capacity floppy disk.

FIG. 2 shows the directory structures of memory cards 21 and 22 and large-capacity floppy disk 23.

By inserting the first memory card 21 into a digital electronic still camera and taking the picture of a subject, a sub-directory "IMFIDX10" managed by a root directory "ROOT" is generated in the first memory card 21. An image file obtained by taking the picture of the subject is managed by the sub-directory "IMFIDX10". (A path is generated by linking directories. In FIG. 2, image files from image file names "DSC00001.JPG" to "DSC00100.JPG" have been stored on the first memory card 21.) Similarly, image files having image file names "DSC00001.JPG" to "DSC00004.JPG" have been recorded on the second memory card 22.

When image files that have been recorded on the first memory card 21 and image files that have been recorded on the second memory card 22 are read out and recorded on the large-capacity floppy disk 23, a sub-directory "0100 FUJI" managed by a root directory "ROOT" is generated on the large-capacity floppy disk 23. The image files that have been read out of the first memory card 21 and the image files that have been read out of the second memory card 22 are managed by the sub-directory "0100 FUJI".

In this embodiment, the file names of image files are numbers. The file names of image files that have been recorded on the first memory card 21 and the file names of image files that have been recorded on the second memory card 22 include some that are identical ("DSC00001.JPG" to "DSC00004.JPG"). Different image files that have been recorded on the same recording medium are not allowed to have the same file names. Accordingly, before different image files are recorded on the large-capacity floppy disk 23, file names are changed in such a manner that the different image files will not possess the same name.

In the example depicted in FIG. 2, image files that have been read out of the first memory card 21 are recorded on the large-capacity floppy disk 23 with the file names illustrated. The image files that have been read out of the second memory card 22 are recorded on the large-capacity floppy disk 23 upon having their file names changed to file names that follow the last file name of the image files that have been read out of the first memory card 21. More specifically, since image files having the file names "DSC00001.JPG" to "DSC00100.JPG" have been stored on the first memory card 21, the image files that have been recorded on the second memory card 22 have their file names "DSC00001.JPG" to "DSC00004.JPG" changed to file names "DSC00101.JPG" to "DSC00104.JPG", which start following the last file name "DSC00100.JPG" of the first memory card 21. The image files having the changed file names are recorded on the large-capacity floppy disk 23.

According to this embodiment, an electronic album is generated on the large-capacity floppy disk 23. Accordingly, an electronic album directory "ALBINFO", described later, is generated and managed by the root directory "ROOT". An album master table (directory name "HMALB.MST") and an album management table (directory name "UAL00001.ALB") are managed by the directory "ALBINFO" of the electronic album.

Figure 3:
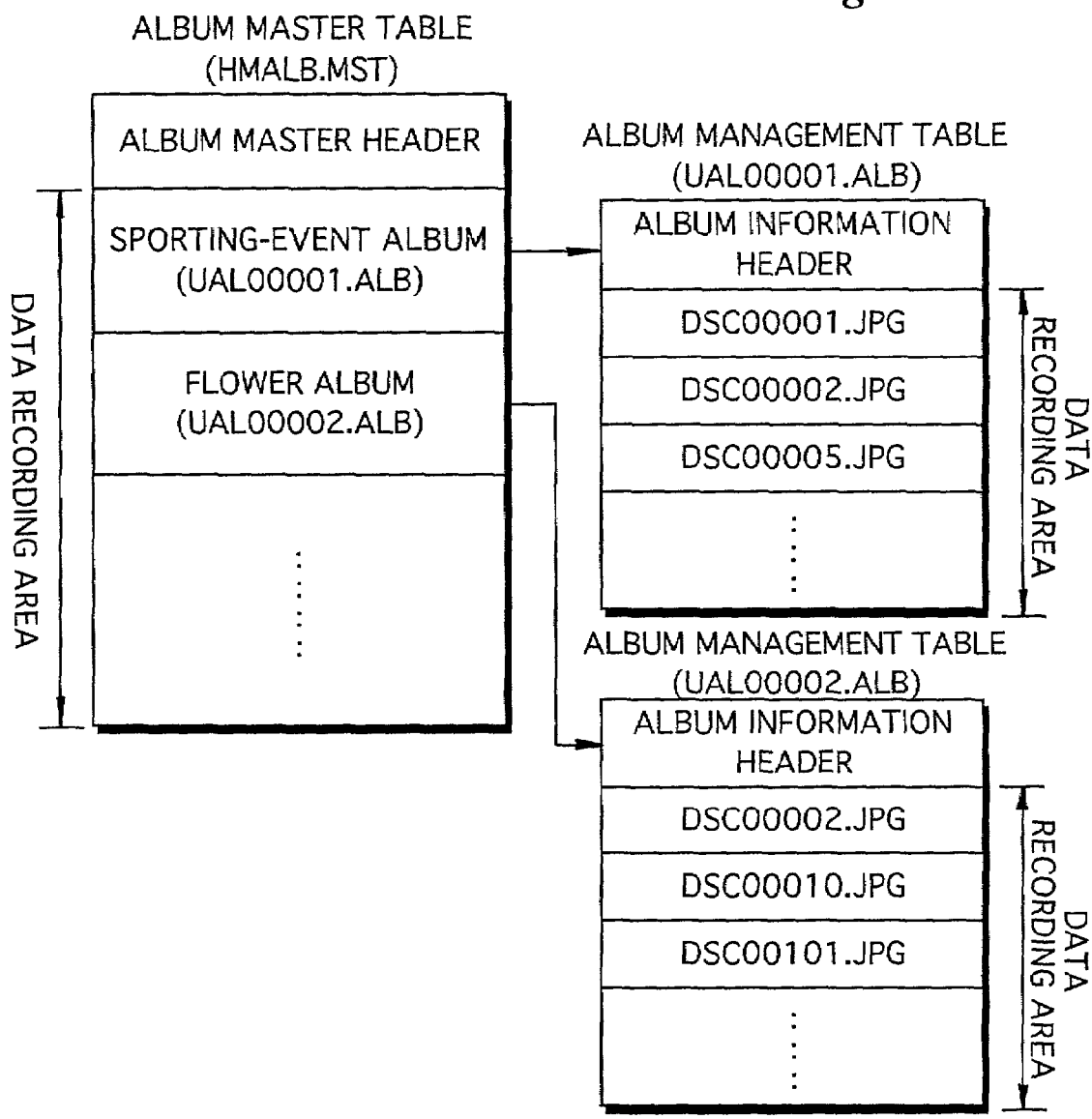
FIG. 3 illustrates an album master table and an album management table.

FIG. 3 illustrates an example of the album master table and an example of album management tables.

The album master table includes an album master header and a data recording area.

The album master header stores management data regarding the album master table (data indicating that this table is the album master table, the addresses of data that has been recorded in the data recording area, etc.).

The data recording area stores the directory name of an album management table for each album (images that have been grouped as an album according to the type of images). For example, an album of a sporting event (an electronic album composed of image files representing images relating to a sporting event) is represented by the directory name "UAL00001.ALB", and an album of flowers (image files representing images relating to flowers) is represented by the directory name "UAL00002.ALB".

An album management table is generated for each directory name that has been recorded in the data recording area of the album master table. Each album management table includes an album information header and a data recording area.

The album information header stores management data regarding the album management table (data indicating that this table is the album management table, the addresses of file names that have been recorded in the data recording area, etc.).

The data recording area of the album management table stores the file names of the image files that constitute the album. Images represented by image files having file names that have been stored in the album management table having the directory name "UAL00001.ALB" relate to the sporting event. Images represented by image files having file names that have been stored in the album management table having the directory name "UAL00002.ALB" relate to flowers.

Figure 4:
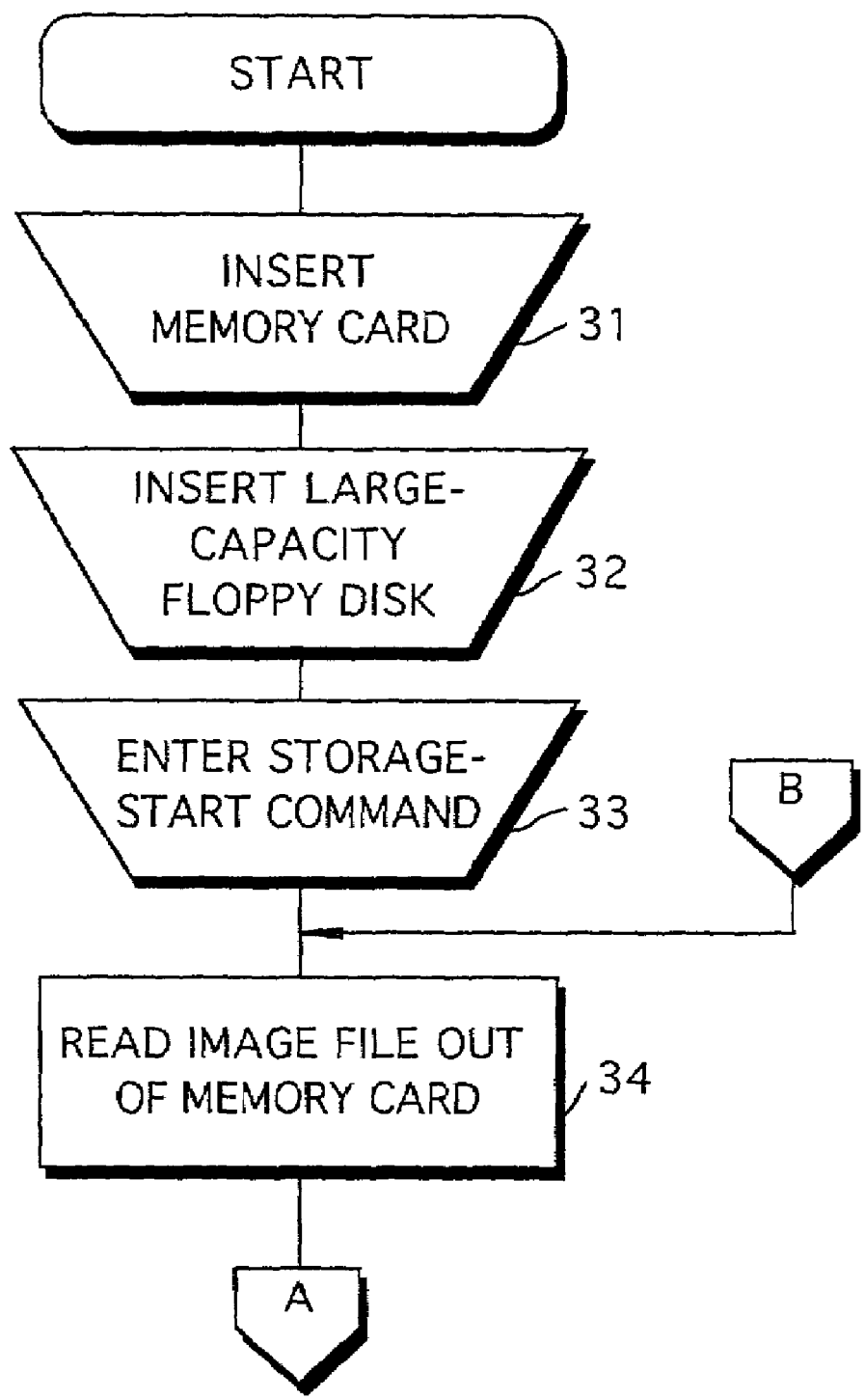
FIGS. 4 and 5 are flowcharts illustrating part of the processing procedure of the image file apparatus.
Figure 5:
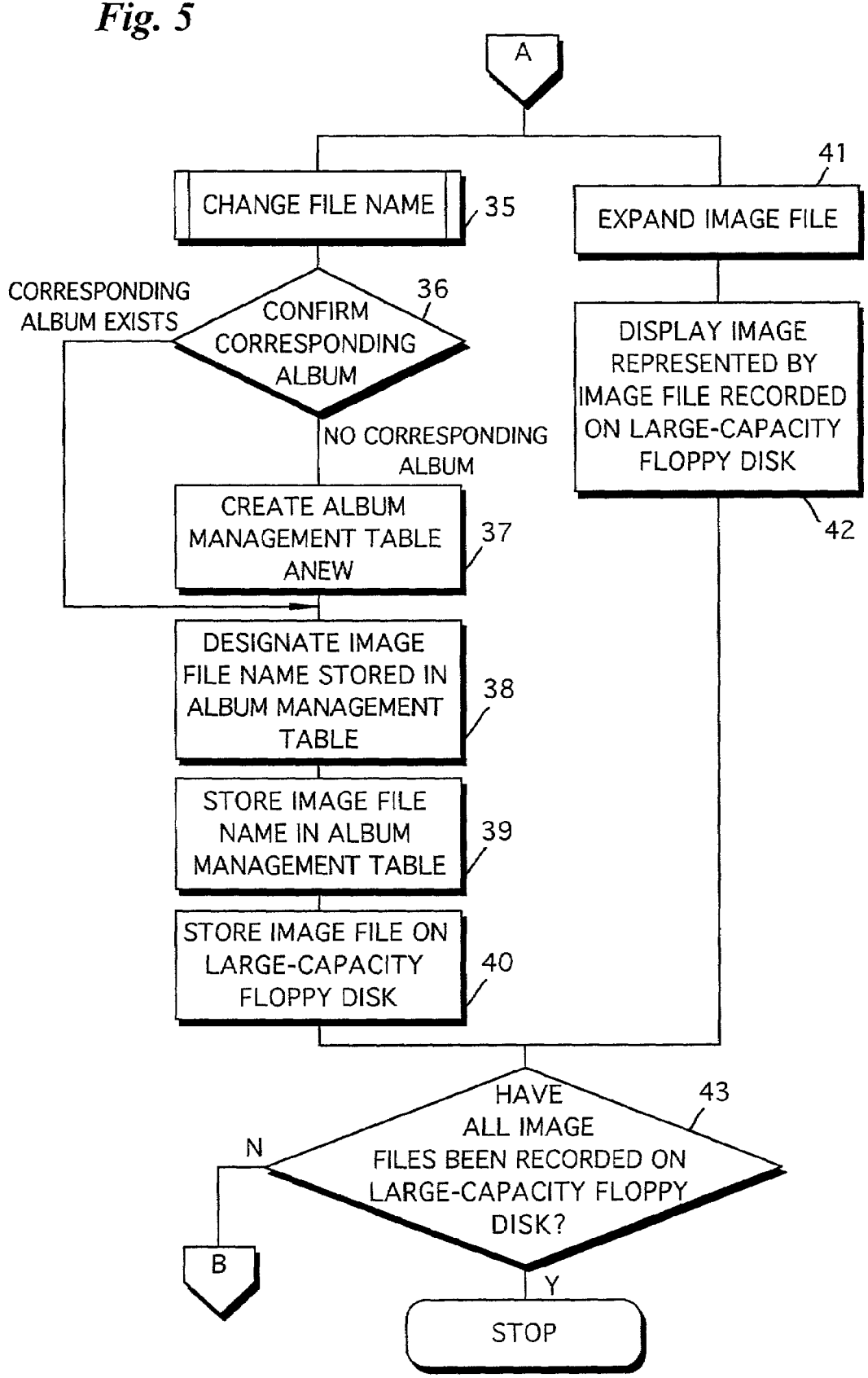
Figure 6:
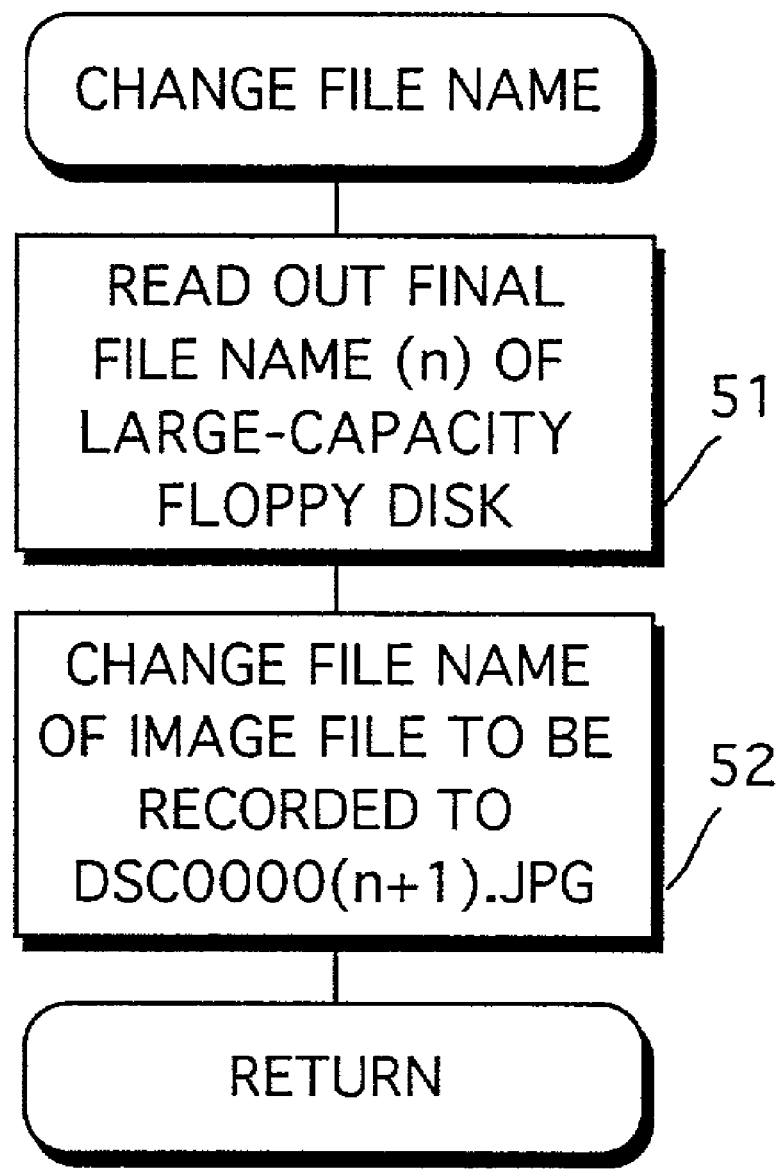
FIG. 6 is a flowchart illustrating the procedure of processing for changing file name.

FIGS. 4 and 5 are flowcharts for describing the procedure of processing image files in the image file apparatus 1. This processing creates an electronic album by reading out image files that have been recorded on the first memory card 21 and image files that have been recorded on the second memory card 22 and recording these image files in the large-capacity floppy disk 23. FIG. 6 is a flowchart illustrating the procedure of processing for changing file names.

The user of the image file apparatus 1 inserts the first memory card 21 and the large-capacity floppy disk 23 in the image file apparatus 1 (steps 31, 32). In response, an image prompting the user to input a storage-start command is displayed on the display screen of the monitor display unit 10 of image file apparatus 1 (step 33).

A signal indicative of the storage-start command enters the CPU 2 via the operation-input interface 9. The CPU 2 controls the memory-card controller 6 so that an image file representing the first frame of an image is read from the image files that have been recorded on the first memory card 21 (step 34). The image file that has been read out of the first memory card 21 is stored in the memory 4 temporarily.

When the image file read out of the first memory card 21 is stored in the memory 4 temporarily, processing for changing the file name is executed (step 35).

According to this embodiment, the file names of image files that are recorded on the large-capacity floppy disk 23 are consecutive numbers. The final file name n (file number) of the image files that have been stored on the large-capacity floppy disk 23 is read out (step 51 of FIG. 6). The numeral obtained by incrementing the number n of the read out file by one becomes the new file number of the image file to be recorded on the large-capacity floppy disk 23 (step 52 in FIG. 6).

In an instance where an image file is recorded on the large-capacity floppy disk 23 for the first time, the large-capacity floppy disk 23 will be empty. The file name of the image file recorded on the large-capacity floppy disk 23 is changed in this case as well. Naturally, in a case where an image file is recorded on the large-capacity floppy disk 23 for the first time and, moreover, the file names of image files that have been recorded on the first memory card 21 have been recorded on the disk in numerical order starting from DSC00001.JPG, the fact that the final file name n on the large-capacity floppy disk 23 will be 0 means that even though the processing of steps 51 and 52 is executed, image files will be recorded on the large-capacity floppy disk 23 under file names identical with those of the image files that have been read out of the first memory card 21.

When a file name is changed, control shifts to processing for creating an electronic album. First, the album master table is read out of the large-capacity floppy disk 23 that has been inserted into the image file apparatus 1. Album names that have been recorded in the data recording area of the album master table are read out and displayed in the form of a list on the display screen of the monitor display unit 10. The user confirms whether the albums displayed in the list contain an album corresponding to the image represented by the image file that the user is attempting to record on the large-capacity floppy disk 23 (step 36).

If a corresponding file does not exist, an album name is assigned anew from the front panel 11. The data representing this album name, together with the directory name corresponding to this album name, is stored in the album maser table that has been recorded on the large-capacity floppy disk 23 by the large-capacity controller 7. Thus there is created an album management table managed by the directory of the new ablum name (step 37). If a corresponding album management table already exists on the large-capacity floppy disk 23, then the processing of step 37 is skipped.

Using the front panel 11, the user of the image file apparatus 1 designates an image file name to be stored in the album management table (step 38). When the image file name is designated, the file name is stored in the corresponding album management table by the large-capacity controller 7 (step 39).

The image file having the image file name that has been changed is read out of the memory 4 by the display/memory controller 8 and is applied to the large-capacity controller 7. The latter records the image file on the large-capacity floppy disk 23 (step 40).

The image file that has been stored on the large-capacity floppy disk 23 is applied also to the compression/expansion engine 5 by the large-capacity controller 7. The image file, which has been compressed, is expanded by the compression/expansion engine 5 (step 41). The expanded image data is applied to the display/memory controller 8. The image represented by the image file being recorded on the large-capacity floppy disk 23 by the large-capacity controller 7 is displayed on the monitor display unit 10 (step 42). Thus the user is capable of determining what image is represented by the image file being recorded on the large-capacity floppy disk 23.

The processing of steps 34 to 42 is repeated until all image files that have been recorded on the first memory card 21 are recorded on the large-capacity floppy disk 23 (step 43).

If all image files that have been recorded on the first memory card 21 are recorded on the large-capacity floppy disk 23, next the second memory card 22 is inserted into the image file apparatus 1. Image files that have been recorded on the second memory card 22 are read out one frame at a time and each image file is recorded on the large-capacity floppy disk 23 upon changing its file name so that it will not duplicate an image file name that has been recorded on the large-capacity floppy disk 23.

If image files having file names from "DSC00001.JPG" to "DSC00100.JPG" have been recorded on the first memory card 21, all image files are recorded on the large-capacity floppy disk 23 under these file names just as cited, as described earlier. If image files having file names from "DSC00001.JPG" to "DSC00004.JPG" have been recorded on the second memory card 22, these image files are recorded on the large-capacity floppy disk 23 upon changing their file names in such a manner that they will continue from the file name (DSC00101.JPG) that follows the last file name (DSC00100.JPG) of the image file that has been recorded on the first memory card 21. Thus different image files are prevented from being recorded on the large-capacity floppy disk 23 under the same file name. Since image files that have already been recorded on the large-capacity floppy disk 23 will not be overwritten, it is possible to prevent the accidental erasure of image file that have been stored on the large-capacity floppy disk 23.

If an electronic album is thus created, an album name is entered from the front panel 11. The album master table of the large-capacity floppy disk 23 is retrieved by the large-capacity controller 7 and the directory name corresponding to the entered album name is found. The album management table managed by the found directory name is searched and the file names that have been stored in the found album management table are read out. By using the large-capacity controller 7, the image files represented by the read file names are read out from the image files being managed by the directory "0100 FUJI". The images constituting the album are displayed successively on the display screen of the monitor display unit 10.

In the embodiment described above, image file names are numbers, but it goes without saying that the image file names are not limited to numbers. In a case where image file names are other than numbers, whether or not image files having file names identical with those of image files that have been read out of a memory card have been recorded on the large-capacity floppy disk 23 would be checked with regard to each individual file name of the image files that have been recorded on the large-capacity floppy disk 23.

Further, even if file names are numbers, there will be instances where the final file name (number) that has been recorded on the large-capacity floppy disk 23 will not be the largest number. In such cases also all image file names that have been recorded on the large-capacity floppy disk 23 would be read out and changed to file numbers such that the file numbers of image files that are to be recorded on the large-capacity floppy disk 23 will not duplicate the file numbers of image files that have already been recorded on the large-capacity floppy disk 23. For example, the largest file number is found from among the file numbers of image files that have been stored on the large-capacity floppy disk 23 and the file name of an image file to be newly recorded on the large-capacity floppy disk 23 is changed in such a manner that the number that follows the largest number will become the new file number.

As many apparently widely different embodiments of the present invention can be made without departing from the spirit and scope thereof, it is to be understood that the invention is not limited to the specific embodiments thereof except as defined in the appended claims.

What is claimed is:

1. A computer readable memory containing instruction executed by a computer to perform a method of recording an image file that has been recorded on a first loadable and removable recording medium on a second loadable and removable recording medium that contains one or more image files, the method comprising:
   reading out, from the second loadable and removable recording medium, file number of the last recorded image file of the one or more images files;
   incrementing the file-number read out from the second loadable and removable recording medium;
   reading out the image file that has been recorded on the first loadable and removable recording medium;
   generating a new file name for the read out image file by changing file name of the image file that has been read out of the first loadable and removable recording medium to the incremented file-number;
   recording the read out image file and the generated new file name on the second loadable and removable recording medium without checking for duplicate file names in the second loadable and removable recording medium.

2. The computer readable memory containing instruction to perform a method according to claim 1, said method further comprising the step of grouping image files, which have been recorded on the second loadable and removable recording medium, according to the types of images represented by the image files.

3. The computer readable memory containing instruction to perform a method according to claim 2, said method further comprising the step of recording a file name corresponding to each group on the second loadable and removable recording medium.

4. The computer readable memory containing instruction to perform a method according to claim 1, wherein the file names of the image files in the second loadable and removable recording medium are such that the numerical characters of the file names of the image files are consecutively numbered, wherein a numerical difference between two consecutive numbers is a predetermined amount for all consecutive numbers.

5. The computer readable memory containing instruction to perform a method according to claim 4, wherein the numerical characters of the file names of the image files are consecutively numbered when image files from a plurality of first loadable and removable recording mediums are read out and recorded on the second loadable and removable recording medium.

6. The computer readable memory containing instruction to perform a method according to claim 4, wherein the predetermined amount is 1.

7. The computer readable memory containing instruction to perform a method, according to claim 1, wherein the step of incrementing the read out last file-number includes always incrementing the last file-number by a predetermined amount.

8. The computer readable memory containing instruction to perform a method according to claim 7, wherein the predetermined amount is 1.

9. The computer readable memory containing instruction to perform a method according to claim 1, wherein the step of reading out a last-file number of image files that have been recorded on the second loadable and removable recording medium comprises directly reading out the file names of the image files recorded on the second loadable and removable recording medium.

10. The computer readable memory containing instruction to perform a method according to claim 1, wherein the numerical characters of the file name is unique to each image file stored in the second loadable and recording medium.

11. An image file method in a image file apparatus for recording an image file that has been recorded on a first loadable and removable recording medium on a second loadable and removable recording medium that contains one or more image files, comprising the steps of:

reading out, from the second loadable and removable recording medium, file-number of the last recorded image file of the one or more images files;

incrementing the read out file-number from the second loadable and removable recording medium;

reading out the image file that has been recorded on the first loadable and removable recording medium;

generating a new file name for the read out image file by changing file name of the image file that has been read out of the first loadable and removable recording medium to the incremented file-number;

recording that read out image file and the generated new file name on the second loadable and removable recording medium without checking for duplicate file names in the second loadable and removable recording medium.

12. The method according to claim 11, further comprising the step or grouping image files which have been recorded on the second loadable and removable recording medium according to the types of images represented by the image files.

13. The method according to claim 12, further comprising the step of recording a file name corresponding to each group on the second loadable and removable recording medium.

14. The method according to claim 11, wherein the files of the image files in the second loadable and removable recording medium are such that the numerical characters of the file names of the image files are consecutively numbered, wherein a numerical difference between two consecutive numbers is a predetermined amount for all consecutive numbers.

15. The method according to claim 14, wherein the numerical characters of the file names of the image files are consecutively numbered when image files from a plurality of first loadable and removable recording mediums are read out and recorded on the second loadable and removable recording medium.

16. The method according to claim 14, wherein the predetermined amount is 1.

17. The method according to claim 11, wherein the step of incrementing the read out last file-number includes always incrementing the last file-number by a predetermined amount.

18. The method according to claim 17, wherein the predetermined amount is 1.

19. The method according to claim 11, wherein the step of reading out a last file-number of file-numbers for image files that have been recorded on the second loadable and removable recording medium comprises directly reading out the file manes of the image files recorded on the second loadable and removable recording medium.

20. The method according to claim 11, wherein the numerical characters of the file name is unique to each image file stored in the second loadable and recording medium.

* * * * *